(12) United States Patent
Wilkes et al.

(10) Patent No.: US 10,480,224 B2
(45) Date of Patent: Nov. 19, 2019

(54) POWER DRIVEN VEHICLE LATCH WITH NON-UNIFORM GEARS

(71) Applicants: Steven Frank Wilkes, Walsall (GB); David Peatey, Solihull (DE)

(72) Inventors: Steven Frank Wilkes, Walsall (GB); David Peatey, Solihull (DE)

(73) Assignee: INTEVA PRODUCTS, LLC, Troy, MI (US)

( * ) Notice: Subject to any disclaimer, the term of this patent is extended or adjusted under 35 U.S.C. 154(b) by 1416 days.

(21) Appl. No.: 14/532,510

(22) Filed: Nov. 4, 2014

(65) Prior Publication Data

US 2015/0123407 A1 May 7, 2015

Related U.S. Application Data (60) Provisional application No. 61/900,097, filed on Nov. 5, 2013.

(51) Int. Cl.
*B60J 5/00* (2006.01)
*E05C 3/12* (2006.01)
(Continued)

(52) U.S. Cl.
CPC .................. *E05C 3/16* (2013.01); *B60J 5/00* (2013.01); *E05B 79/20* (2013.01); *E05B 81/20* (2013.01);
(Continued)

(58) Field of Classification Search
CPC ... E05C 3/16; E05C 3/12; E05B 81/36; E05B 81/25; E05B 81/20; E05B 79/20;
(Continued)

(56) References Cited

U.S. PATENT DOCUMENTS 2,049,906 A * 8/1936 Hawgood ............ B65D 45/345
292/256.65
7,360,337 B2 * 4/2008 Yoneyama .............. E05B 81/20
49/280
(Continued)

FOREIGN PATENT DOCUMENTS

CN 1782310 A 6/2006
CN 102328622 A 1/2012
(Continued)

OTHER PUBLICATIONS

CN Office Action dated Aug. 2, 2016 for Chinese Invention Patent Application No. 2014106381308.
(Continued)

*Primary Examiner* — Kristina R Fulton
*Assistant Examiner* — Thomas L Neubauer
(74) *Attorney, Agent, or Firm* — Cantor Colburn LLP (57) ABSTRACT

A vehicle latch is disclosed herein, the vehicle latch, having: a first gear with a first gear pitch radius that reduces from a first gear tooth to an ending gear tooth; a second gear with a second gear pitch radius that increases from a first gear tooth to an ending gear tooth, the second gear being rotatably mounted to the latch for movement about a second gear axis; and wherein rotation of the second gear causes a claw of the latch to move from a first position to a second position, the second position corresponding to a closed state of the latch.

20 Claims, 4 Drawing Sheets

(51) Int. Cl.
    *E05C 3/16*    (2006.01)
    *E05B 79/20*   (2014.01)
    *E05B 81/20*   (2014.01)
    *E05B 81/24*   (2014.01)
    *E05B 81/36*   (2014.01)

(52) U.S. Cl.
    CPC .............. *E05B 81/25* (2013.01); *E05B 81/36* (2013.01); *E05C 3/12* (2013.01); *Y10T 292/0945* (2015.04); *Y10T 292/0946* (2015.04); *Y10T 292/0949* (2015.04)

(58) Field of Classification Search
    CPC ................ B60J 5/00; Y10T 292/0945; Y10T 292/0949; Y10T 292/0946
    See application file for complete search history.

(56) References Cited

U.S. PATENT DOCUMENTS

| | | | |
|---|---|---|---|
| 8,899,638 B2 * | 12/2014 | Flamm | E05B 47/026 188/265 |
| 2006/0103145 A1 | 5/2006 | Ottolini et al. | |
| 2011/0309640 A1 | 12/2011 | Matsubara | |
| 2012/0091740 A1 | 4/2012 | Chevalier | |

FOREIGN PATENT DOCUMENTS

| | | |
|---|---|---|
| CN | 102356207 A | 2/2012 |
| JP | 347383 | 2/1991 |
| JP | 201169190 | 4/2011 |

OTHER PUBLICATIONS

English Machine Translation to Abstract JP2011069190 (A).
English Machine Translation to Abstract JPH0347383 (A).
Search Report for Chinese Invention Patent Application No. 2014106381308.

* cited by examiner

POWER DRIVEN VEHICLE LATCH WITH NON-UNIFORM GEARS

CROSS REFERENCE TO RELATED APPLICATIONS

This application claims the benefit of U.S. Provisional Patent Application Ser. No. 61/900,097 filed Nov. 5, 2013 the entire contents of which are incorporated herein by reference thereto.

FIELD OF THE INVENTION

This invention relates generally to a latch assembly for a vehicle door and more specifically to a power drive vehicle latch assembly with a non-uniform pair of gears that provide a variable gear ratio during operation of the vehicle latch assembly.

BACKGROUND OF THE INVENTION

Power actuated vehicle closure and release door latch systems use a motor drive unit, which moves an item such as a lever, housed in a latch body, from a rest position to a maximum travel position. The item or lever is generally connected to or operatively coupled to a claw of the latch via a gear train or other equivalent device or system such that as the lever or item is moved between its rest position and its maximum travel position a corresponding desired movement of the claw is also achieved. The claw when rotated or moved engages and retains a striker thereby closing or holding an associated vehicle door in a closed position.

In order to move or rotate the claw sufficiently in the desired range of movement, the lever or item operatively coupled to the claw must also move in a desired range or angle of movement to cause the required movement of the claw as well as accommodate for applied system loads which are caused by a sealing member of the vehicle door opening that is being closed as well as tolerances generated by the gear train or linkage of the latch. As such, the lever or item driven by the motor must be operated or rotated at an angle within the latch body and have sufficient travel with respect to gears or linkage being driven in order to provide repeatable latching within operable limits. Also, the angle at which this lever or item can be operated is limited physically by adjacent structures and mechanisms within the latch body. To change the gear ratio in order to increase the movement of a final gear operatively coupled to the claw may require increasing a length of a crank arm coupled to the final gear as well as unacceptably increase the load on the lever, the crank arm and the motor drive.

Accordingly, it is desirable to provide a power drive vehicle latch assembly that is able to provide a desired range of claw movement with a desired closing force via a range of movement of a lever in the latch without any appreciable change in a crank arm length or loading on the lever, crank arm or motor drive.

SUMMARY OF THE INVENTION

In accordance with one exemplary embodiment of the invention, a vehicle latch is provided. The vehicle latch, having: a first gear having a first plurality of gear teeth with a first involute form gear profile that follows a scroll profile with a first gear pitch radius that reduces from a first gear tooth to an ending gear tooth of the first plurality of gear teeth, the first gear being rotatably mounted to the latch for movement about a first gear axis; a second gear having a second plurality of gear teeth with a second involute form gear profile that follows a scroll profile with a second gear pitch radius that increases from a first gear tooth to an ending gear tooth of the second plurality of gear teeth, the second gear being rotatably mounted to the latch for movement about a second gear axis, wherein the second plurality of gear teeth meshingly engage the first plurality of gear teeth along a path defined between the first gear teeth of the first gear and the second gear and the ending gear teeth of the first gear and the second gear as first gear first gear rotates about the first axis and the second gear rotates about the second axis, wherein a torque applied to the first gear when the first gear tooth of the first gear engages the first gear tooth of the second gear in order to rotate the first gear about the first axis is lower than a torque applied to the first gear when the ending gear tooth of the first gear engages the ending gear tooth of the second gear in order to rotate the first gear about the first axis; and wherein rotation of the second gear causes a claw of the latch to move from a first position to a second position, the second position corresponding to a closed state of the latch.

In accordance with another exemplary embodiment of the present invention, a latch system is provided. The latch system, having: a motorized closure mechanism, including a motor configured to provide a force to a cable; and a latch operably coupled to the motorized closure mechanism, the latch having: a first gear having a first plurality of gear teeth with a first involute form gear profile that follows a scroll profile with a first gear pitch radius that reduces from a first gear tooth to an ending gear tooth of the first plurality of gear teeth, the first gear being rotatably mounted to the latch for movement about a first gear axis; a second gear having a second plurality of gear teeth with a second involute form gear profile that follows a scroll profile with a second gear pitch radius that increases from a first gear tooth to an ending gear tooth of the second plurality of gear teeth, the second gear being rotatably mounted to the latch for movement about a second gear axis, wherein the second plurality of gear teeth meshingly engage the first plurality of gear teeth along a path defined between the first gear teeth of the first gear and the second gear and the ending gear teeth of the first gear and the second gear as first gear first gear rotates about the first axis and the second gear rotates about the second axis, wherein a torque applied to the first gear when the first gear tooth of the first gear engages the first gear tooth of the second gear in order to rotate the first gear about the first axis is lower than a torque applied to the first gear when the ending gear tooth of the first gear engages the ending gear tooth of the second gear in order to rotate the first gear about the first axis; and wherein rotation of the second gear causes a claw of the latch to move from a first position to a second position, the second position corresponding to a closed state of the latch.

In accordance with yet another exemplary embodiment of the present invention, a method of operating a latch system is provided. The method including the steps of: rotating a cable lever rotationally mounted to the latch from a first position to a second position; rotating a first gear rotatably mounted to the latch with the cable lever as the cable lever moves from the first position to the second position; rotating a second gear rotatably mounted to the latch with the first gear, the second gear being in meshing engagement with the first gear and having a first plurality of gear teeth with a first involute form gear profile that follows a scroll profile with a first gear pitch radius that reduces from a first gear tooth to an ending gear tooth of the first plurality of gear teeth and wherein the second gear has a second plurality of gear teeth with a second involute form gear profile that follows a scroll profile with a second gear pitch radius that increases from a first gear tooth to an ending gear tooth of the second plurality of gear teeth, wherein the second plurality of gear teeth meshingly engage the first plurality of gear teeth along a path defined between the first gear teeth of the first gear and the second gear and the ending gear teeth of the first gear and the second gear as first gear first gear rotates about a first axis and the second gear rotates about a second axis, wherein a torque applied to the first gear when the first gear tooth of the first gear engages the first gear tooth of the second gear in order to rotate the first gear about the first axis is lower than a torque applied to the first gear when the ending gear tooth of the first gear engages the ending gear tooth of the second gear in order to rotate the first gear about the first axis; and wherein rotation of the second gear causes the claw of the latch to move from a first position to a second position, the second position corresponding to a closed state of the latch.

Additional features and advantages of the various aspects of exemplary embodiments of the present invention will become more readily apparent from the following detailed description in conjunction with the drawings wherein like reference numerals refer to corresponding parts in the several views.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION OF EXEMPLARY EMBODIMENTS

Exemplary embodiments of the invention relate to a latch system that includes a latch or latch assembly that is driven by a power drive system which includes a cable or Bowden cable. The latch assembly includes a pair of non-uniform gears that provide a gear ratio which varies during latching from an initial latch state or safety position to a fully latched state. The pair of gears cooperate to provide a larger gear ratio during an initial latching state and a smaller gear ratio during a latter latching state. The larger gear ratio results in a lower load on the system driving the gears during an initial latching state and an increased load applied on the system when it reaches a fully latched state. Moreover, the configuration of the gears provide the desired movement of the claw of the latch with the desired closing force along with a limited range of movement of a cable lever operatively coupled to the pair of gears and a motor drive unit. In one embodiment, the increased load at the fully latched state would be the same load on the system that would be provided by a system having a pair of gears with non-varying gear ratios. As will be described herein, the system will comprise a pair of non-uniform gears configured to be cooperate with each other wherein a first non-uniform gear and a second non-uniform gear each have a gear pitch radius that follows a scroll profile in order to provide the variable gear ratios during latching. Also disclosed herein is a method of operating a latch system in order to apply an initial gear ratio during an initial latching state and a different gear ratio during an ending state of latching.

Figure 1:
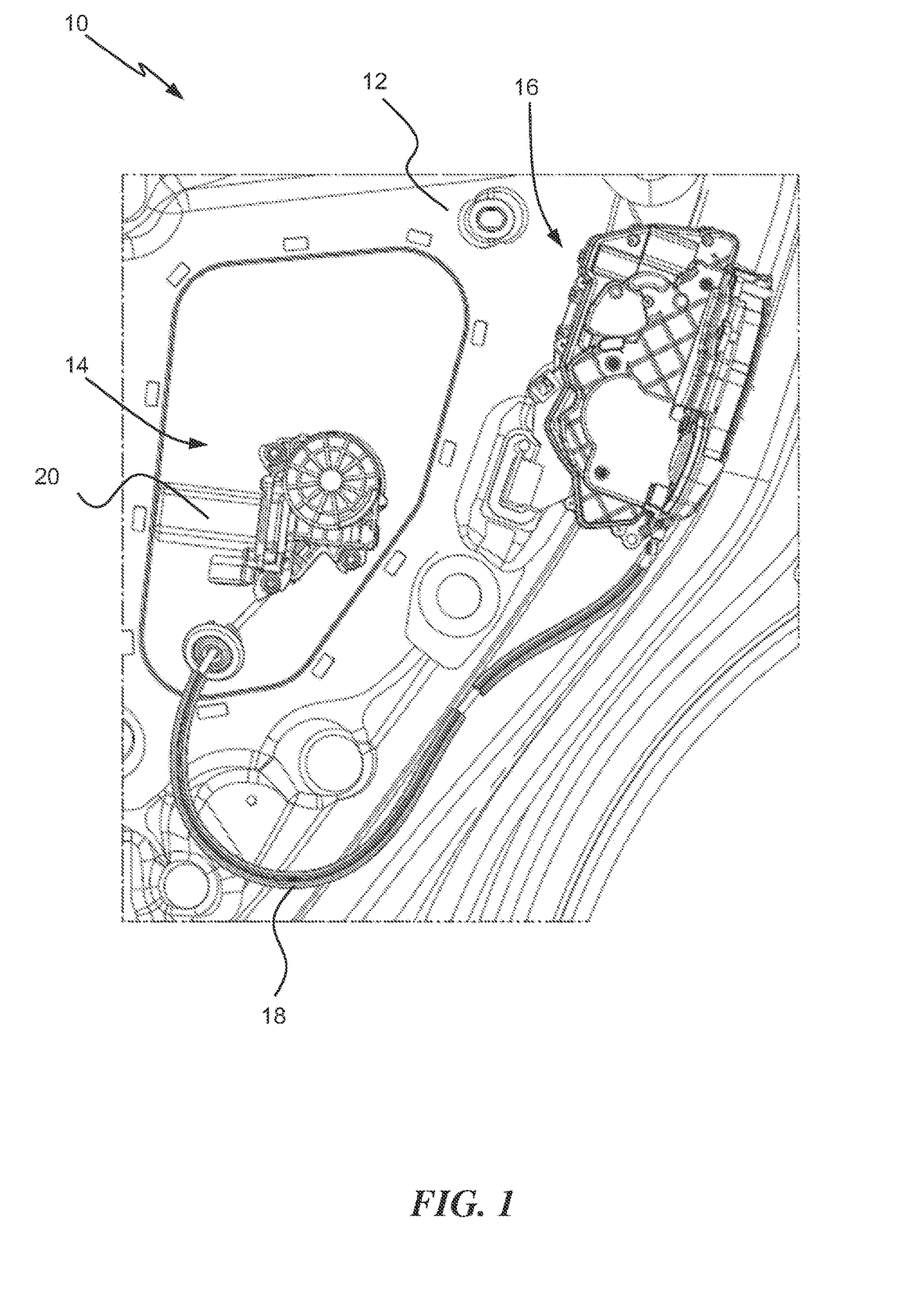
FIG. 1 is a side view illustrating a latch system having a latch or latch assembly according to an exemplary embodiment of the invention.

Referring now to the drawings, a latch system 10 of an embodiment of the invention is illustrated in FIG. 1. The latch system 10 is coupled to a vehicle door 12 and includes a power drive system 14 that is operably coupled to a latch or latch assembly 16 with a cable (e.g., Bowden cable) 18. It is to be appreciated that the latch system 10 may be installed in any vehicle that utilizes a latch or latch assembly 16 with a larger gear ratio during an initial latching state and a smaller gear ratio during a latter latching state in order to apply a smaller load and torque to a door seal and the vehicle door 12 at an initial stage of latching and a larger load and torque to a door seal on the vehicle door 12 during the final or ending stage of latching.

In one embodiment, the power drive system 14 is remotely located from the latch assembly 16. The power drive system 14 includes a motor 20, bidirectional or otherwise that is coupled to a first end of cable 18 through a motor shaft (not shown), which drives a worm, worm wheel and cable drum in order to apply a force to cable 18 as is known in the related arts. A second opposite end of the cable 18 is coupled to a cable lever 34 (See at least FIGS. 2A and 4A) of latch assembly 16. In one embodiment, actuating the motor 20 while latching the latch assembly 16 from a first latching state or safety position to a fully latched state causes the motor shaft (not shown) to rotate in a first rotational direction and the resultant rotation is translated into a pulling force on the cable 18 via rotation of a cable drum. The pulling force on the cable 18 drives rotation of a pair of non-uniform spur gears 38 and 40 (See at least FIG. 2A) through a variable gear ratio in order to apply torque to a latch claw and retain the striker within the claw body during sealing of the associated vehicle door 12.

Figure 2A:
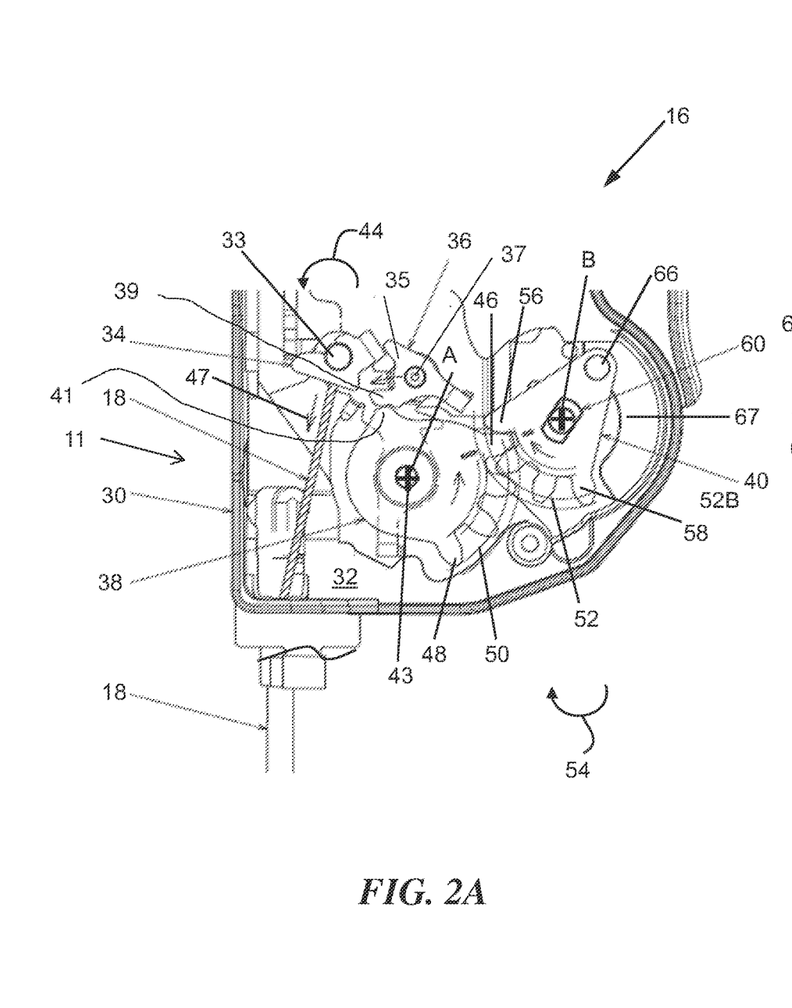
FIGS. 2A-2B are partial cross-sectional views illustrating an initial state or first safety state of a latch assembly of FIG. 1 according to an exemplary embodiment of the present invention.
Figure 2B:
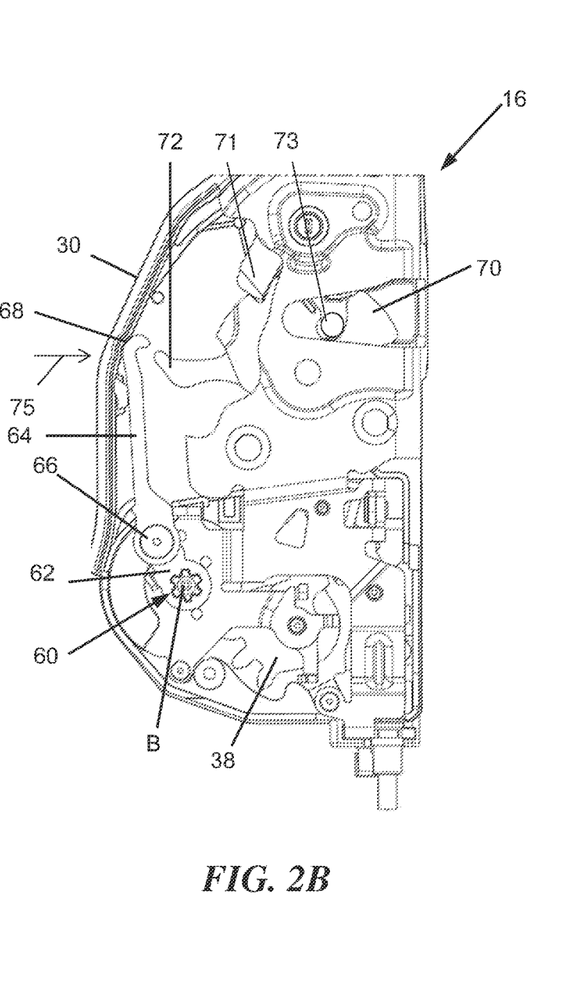

FIG. 2A provides an enlarged and partial cross-sectional view of a front or one side of the latch assembly 16 while FIG. 2B provides an enlarged and partial cross-sectional view of a rear or opposite side of the latch assembly 16. As illustrated in FIGS. 2A-2B, latch assembly 16 is illustrated during an initial closure state such as a first latch state or first safety position as will be described in further detail below. This initial closure state may be referred to a first primary or first safety state (illustrated in at least FIGS. 2A and 2B), wherein a claw, latch claw or forkbolt 70 of the latch is partially closed (e.g., not fully closed) and a detent lever 71 has engaged the claw. As used herein the first primary or first safety state refers to the state of the latch 16 wherein a striker 73 has been engaged by a throat of the claw, latch claw or forkbolt 70 and the detent lever 71 has engaged the claw 70 such that the claw 70 cannot rotate into an open position, wherein the striker 73 can be removed from the throat of the claw, unless the detent lever or pawl 71 has been moved to a disengaged position wherein the detent lever or pawl 71 no longer engages the claw 70. When the latch 16 is in the first primary or first safety state, the claw 70 can be rotated into a closed position of the latch 16, wherein the claw 70 is rotated counter clockwise from the positions illustrated in FIGS. 2B and 3B to the position in 4B. During this movement, the claw 70 engages the striker 71 and the latch 16 by virtue of the rotation of the claw 70 causes a door 12 the latch 16 is located on to be sealed or completely closed in an opening of the vehicle body and a sealing strip about the door opening is compressed. In one non-limiting embodiment, it is the movement of the claw 70 from the first primary or first safety state (FIGS. 2A, 2B) to the closed state (FIGS. 4A, 4B) that is achieved by the pair of gears 38, 40 or system of various embodiments of the present invention.

The latch assembly 16 also includes a latch body 30 that provides an interior cavity 32 for receiving a cable lever 34, a pawl system 36, a first non-uniform spur gear 38 and a second non-uniform spur gear 40. The cable lever 34 is coupled to cable or Bowden cable 18 about joint 33.

Figure 4A:
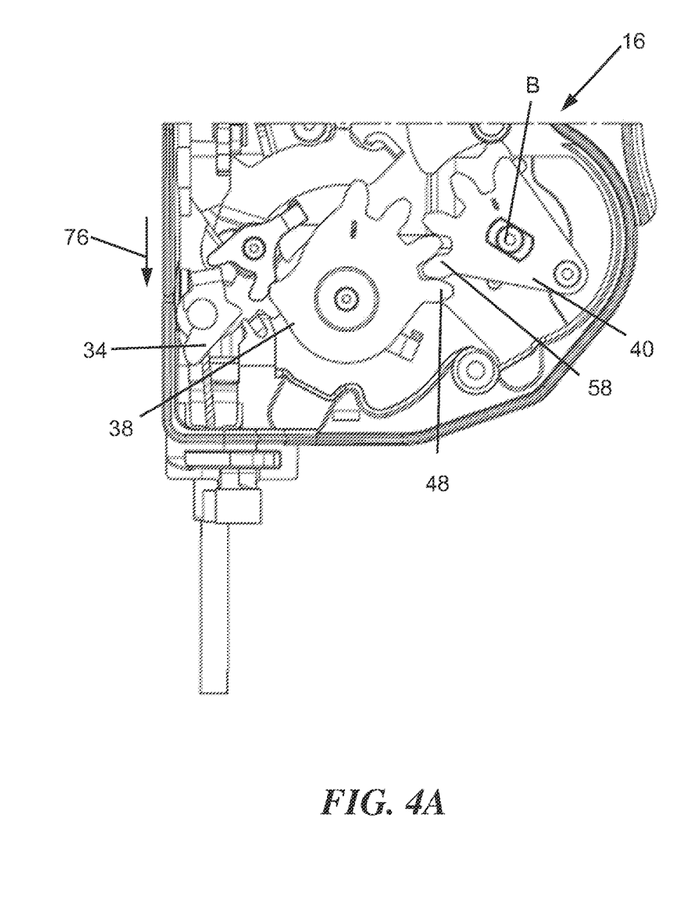
FIGS. 4A-4B are partial cross-sectional views illustrating the latch in a fully latched state.
Figure 4B:
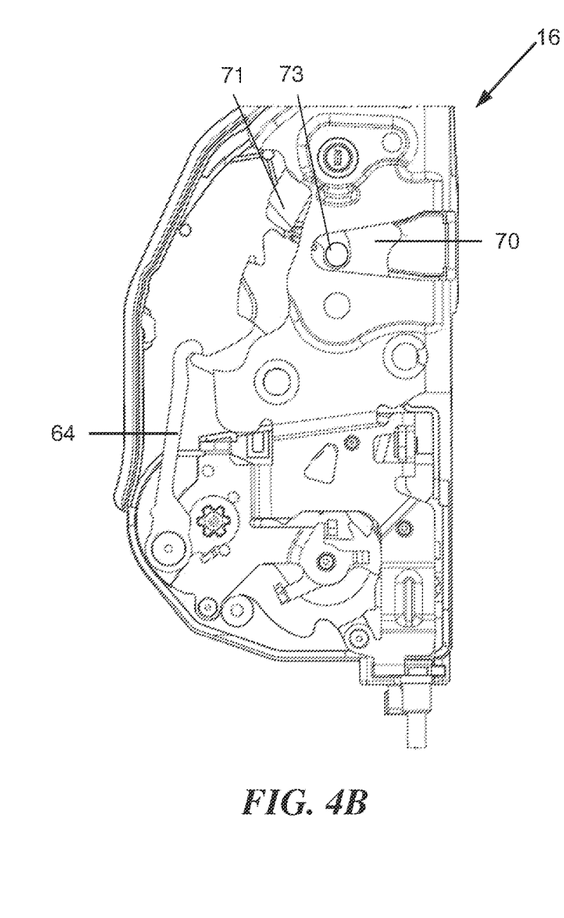

As described above, the latch 16 is provided with a motorized closure mechanism or power drive system 14, which when activated will transition the latch from a partially latched state or safety position (FIGS. 2A, 2B) to a fully latched or closed state (FIGS. 4A, 4B). In an alternative embodiment, the motorized closure mechanism or power drive system 14 may be configured to transition the latch 16 from an open state to a fully latched or closed state.

Figure 3A:
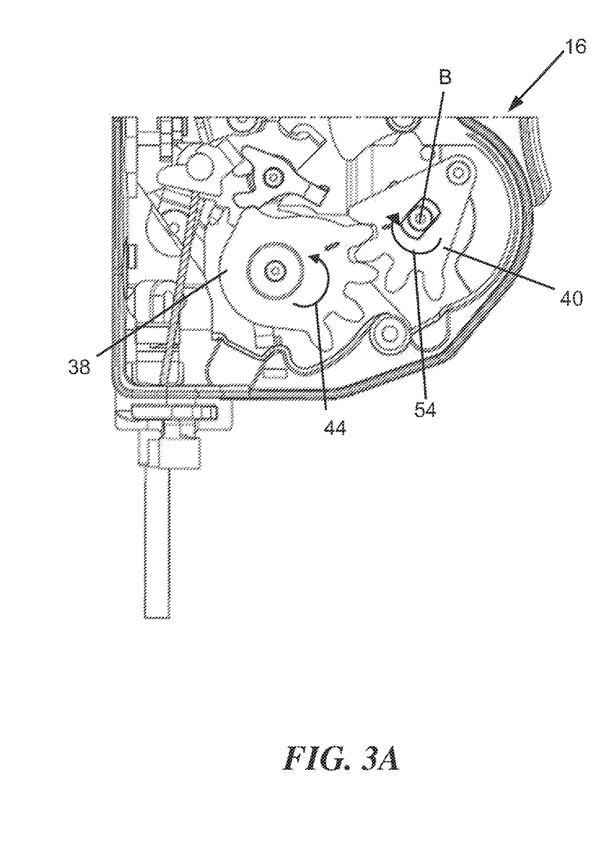
FIGS. 3A-3B are partial cross-sectional views illustrating progression of the latch assembly from the position of FIGS. 2A, 2B to that of FIGS. 4A, 4B.
Figure 3B:
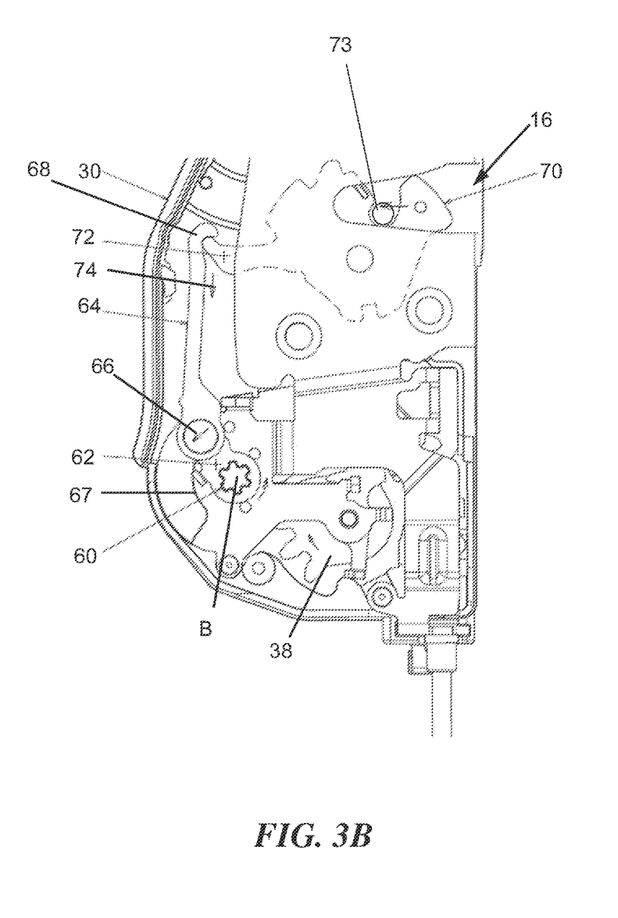

When the latch 16 is in the safety position illustrated in at least FIGS. 2A and 2B, and the motorized closure mechanism or power drive system 14 of the latch 16 is activated, the cable 18 is pulled in the direction of arrow 47 via a motor 20. Cable 18 is secured to the cable lever 34 movably mounted to the latch for movement between a first position (See at least FIG. 2A) and a second position (See at least FIG. 4A), wherein FIGS. 3A and 3B are intermediate positions between those illustrated in FIGS. 2A, 2B and 4A, 4B. Also secured to the cable lever 34 is a power closure pawl 35 such that as the cable lever 34 moves from the first position to the second position a corresponding movement of the power closure pawl 35 also occurs. The power closure pawl 35 is also pivotally mounted to the cable lever 34 for rotational movement or pivotal movement about axis 37. The power closure pawl 35 has a feature 39 configured to engage a complimentary feature 41 of first gear 38, which is rotationally or pivotally mounted to the latch 10 for movement about an axis 43 or "A".

As such and when cable 18 is pulled in the direction of arrow 47, by the motor 20 of the motorized closure mechanism 14, the cable lever 34 and the power closure pawl 35 move from their first position in at least FIG. 2A to their second positions seen in at least FIG. 4A, wherein FIG. 3A is an intermediary position between those of FIGS. 2A and 4A. This movement causes a counter clockwise movement of gear 38 in the direction of arrow 44 about axis 43 via engagement of the feature 39 with feature 41.

The rotational movement of gear 38 causes rotational movement of a closure lever or lock link 64 from a first position (see at least FIG. 2B) to a second position (see at least FIG. 4B), which causes a hook portion of the closure lever or lock link to engage a tab portion of the claw 70. Thereafter, continued rotation of gear 38 causes the closure lever to travel in the direction of at least arrow 74 in order to rotate the claw from the safety position of FIG. 2B to the closed position of FIG. 4B as the closure lever or lock link moves in the direction of arrow 74 and thus power closure of the latch 16 is achieved.

As referred to herein, the motorized closure mechanism 14 may in one non limiting embodiment comprise any combination of motor 20, cable 18, cable lever 34, power closure pawl 35, gear 38, closure lever or lock link 64 and equivalents thereof. It is also understood, that the motorized closure mechanism 14 may also comprise additional components in addition to the aforementioned components or simply just a single component configured to transition the claw 70 into a closed state via operation of a mechanism such a motor 20. Still further motor 20 may be operatively coupled to a sensor configured to detect an operational state of a component of latch 16 (e.g., claw or any other component) or receive a wireless signal in order to provide a signal to motor 20 to activate motor such that it can begin pulling of cable 18 in the direction of arrow 47.

As discussed above, movement of the cable 18 in the direction of arrow 47 causes the cable lever 34 to be driven or rotated in a counter-clockwise (CCW) direction 44 about the pivot axis A. This movement also causes gears 38, 40 to be rotated. The first gear 38 is operatively coupled to the cable lever and is rotated in a counter-clockwise (CCW) direction 44 about pivot axis A by rotation of cable lever 34.

The first gear 38 is a spur gear with an involute form gear profile. The first gear 38 has a gear pitch radius 50 illustrated by the concentric arcs in FIG. 2A that follows a non-uniform scroll profile and decreases from a first gear tooth 46 to an ending gear tooth 48 as gear 38 rotationally traverses from a starting rotational position illustrated in FIG. 2A in a CCW direction 44 to an ending position illustrated in FIG. 4A. The reducing gear pitch radius begins at gear tooth 46 and ends at gear tooth 48 and is illustrated by the concentric arcs in FIG. 2A.

The second gear 40 is also a spur gear with an involute form gear profile and has a gear pitch radius 52 also illustrated by the concentric arcs in FIG. 2A that follows a non-uniform scroll profile, which increases as the second gear 40 rotationally traverses from a starting rotational position illustrated in FIG. 2A in a CW direction 54 to an ending position illustrated in FIG. 4A. This gear pitch radius begins at gear tooth 56 and ends at gear tooth 58. The second gear 40 being in meshing engagement with the first gear 38 such that rotational movement of the first gear 38 drives rotation of the second gear 40 about pivot axis B. Further, as gear tooth 46 meshes with gear tooth 56 at the beginning of travel, the decreasing gear pitch radius 50 and the increasing gear pitch radius 52 causes the starting gear ratio between gears 38 and 40 to be higher at their initial point of rotation (See at least FIG. 2A) as opposed to the final point of rotation (See at least FIG. 4A). The higher gear ratio is greater than that, which would be provided by a pair of gears having a fixed gear ratio (e.g., no gear ratio variation as the gears are rotated) that would be the same gear ratio as that of the ending position of the gears 38 and 40 illustrated in FIG. 4A. It being understood that while gear 38 rotates in the CCW direction 44, gear 40 rotates in an opposite CW direction 54.

By providing a pair of gears with a higher gear ratio at the initial point of contact than at a final point of contact due to the decreasing gear pitch radius 50 and the increasing pitch radius 52, a smaller load is applied to the system at the beginning of travel of the latch assembly 16 (See for example FIG. 2A). Thereafter and as the gears 38, 40 rotate from the position of FIG. 2A to FIG. 3A and ultimately FIG. 4A, the gear ratio progressively decrease and thus the load applied to the system is greater at the end position (FIG. 4A) as opposed to the load at the beginning position (FIG. 2A).

Accordingly and as rotation of the first and second gears 38, 40 progress towards the end of travel of latch assembly 16, the gear ratio progressively reduces and the load increases. Moreover, the load at the end of travel is provided by a limited range of movement of the cable lever 34 from the position in FIG. 2A to that of the position in FIG. 4A without having to increase the operative length of lever 34. In addition and through the use of the varying gear ratios and changing gear pitch radii or radiuses 50, 52, the desired rotational range of movement of gear 40 and ultimately claw 70 (e.g., from the position in FIG. 2B to FIG. 4B) is achieved without increasing the required rotational range of movement of gear 38 as well as cable lever 34. In other words, gear 40 rotates further than a corresponding rotational movement of gear 38 or the movement of gear 40 can be increased without increasing unacceptably the load on lever 34, cable 18 and the motor drive system 14 as would increasing the length of crankshaft lever 62.

In one embodiment, the load at the end of travel of the gears 38, 40 is substantially the same as that for a pair of fixed tooth gears (e.g., no variation in gear ratio and/or no variation in the gear pitch radius of the gears 38 and 40) required for a door latching event. As such, and when gear tooth 48 engages gear tooth 58 an increase in torque or the highest torque is applied to the forkbolt, claw or latch claw 70 when a seal of the door seal is being compressed as the latch 16 is moved into its fully latched state. In one non-limiting embodiment, this torque (e.g., at the end of the gears 38, 40 travel) is the same as that would be applied if the gears 38, 40 did not have a variation in gear ratio and/or a variation in the gear pitch radius) for the same door closing event.

The latch assembly 16 also includes a crankshaft 60, a crankshaft lever 62 and a lock link or closure lever 64 on an opposite face of the latch assembly 16 (See at least FIG. 2B). The crankshaft 60 is operatively coupled to the second gear 40, by for example a shaft such that rotation second gear 40 causes movement or rotation of the crank shaft 60. Also, the crankshaft lever 62 is rotationally coupled at joint 66 to the lock link or closure lever 64 at its proximal end, which that allows the lock link 64 to move first in the direction of arrow 75 and then longitudinally in direction of arrow 74 (See at least FIGS. 2B and 3B) as joint 66 travels in a semi-circular path 67 about axis B due to rotation of the second gear 40 about axis B.

The lock link 64 is generally elongate in shape and includes a hook portion 68 at a distal end. The hook portion 68 is configured to engage a complementary hook portion 72 of a claw or latch claw 70 during latching of the latch assembly 16 from a first latch state.

Operation of the latch assembly 16 will now be discussed with reference to FIGS. 2A-4B. Through manipulation of the cable or Bowden cable 18, the motor 20 (See FIG. 1) can achieve power closing from an initial latch state or home position (shown in FIGS. 2A-2B) to a fully latched state (shown in FIGS. 4A-4B). In the initial latch state, the cable lever 34 is at its rest position and the lock link 64 is not mechanically engaging the claw or latch claw 70. In the fully latched state, the cable lever 34 has moved from its rest position to a maximum travel position and the lock link 64 applied a torque to a latch claw 70 that engages the striker 73 with force in order to secured the vehicle door 12 to a vehicle body wherein a sealing material about the periphery of the door opening is compressed. Initially, in the initial latch state (i.e., latch assembly 16 is at rest), the hook portion 68 does not engage the hook portion 72 of claw or latch claw 70 and gear tooth 46 engages a surface of gear tooth 56 without application of torque. To move towards a fully latched state, the motor 20 is actuated whereby a pulling force is applied to the Bowden cable or cable 18 in the direction of arrow 47. Under this pulling force, the cable lever 34 is rotated in a CCW direction 44 about pivot axis A. Since the first gear 38 is operatively coupled to elongated cable lever 34, the first gear 38 also rotates in a CCW direction 44 about pivot axis A.

As the first gear 38 rotates, it applies a rotational torque on the corresponding gear teeth of the second gear 40 causing the second gear 40 to also rotate. As a result, the second gear 40 rotates in a CW direction 54 about pivot axis B. The gear tooth 46 applies an initial torque on gear tooth 56 at the initial point of rotation of the first and second gears 38, 40. It is appreciated that as the gears 38, 40 rotate, pitch radius 50 decreases while pitch radius 52 increases. In addition, the initial starting gear ratio between the gears 38, 40 is higher at the initial state (FIG. 2A) than the final state (FIG. 4A) and thus a smaller torque is applied at the initial state than that as the final state. In addition and in comparison with a pair of gears 38 and 40 that have a fixed gear ratio and no variation in gear pitch radius that correspond to the load applied at the end of the gear travel (e.g., the position of FIG. 4A) the corresponding load at the initial state (FIG. 2A) will be much higher than the load applied by the present invention wherein the gears 38 and 40 have a varying gear ratio as well as varying gear pitch radiuses or radii.

In other words if gears 38 and 40 had a fixed gear ratio and no variation in gear pitch radius in order to provide the same load as the gears 38, 40 illustrated in the FIGS. the initial load at the position of FIG. 2A would be much higher than the initial load applied by the gears 38, 40 illustrated in FIG. 2A. As discussed, above, it is desirable to provide a smaller torque or load to the system as its initial state since there may not be enough real estate or room in the housing to accommodate the components required for such a loading at the initial state and during transition from the first safety position to the fully latched position, a sealing strip or weather stripping about the periphery of the vehicle door opening is not fully compressed at the initial state as opposed to the final state and as such, higher loads or torques may not be necessary until the sealing strip begins to be compressed at the final stage (e.g., high loads are required as the sealing strip is compressed as the latch moved from the first safety position to the fully latched state and draws the vehicle door in towards the sealing strip). Furthermore and if varying gear ratios were not provided (e.g., a fixed gear ratio) a much larger range of movement of cable lever 34 would be required. Still further, the operative length of the lever 34 would also have to be increased. As discussed above, the housing 30 does not provide enough room or real estate for such a range of movement. Accordingly, the pair of gears 38, 40 with a varying gear ratio allows the smaller housing 30 to be used while also providing the desired rotational movement of gear 40 with the required torque which ultimately results in the desired movement of claw 70 with the required torque or force.

In accordance with an exemplary embodiment and as the first and second gears 38 and 40 rotate in their respective rotational directions 44, 54, the gear ratios progressively decreases. As the first and second gears 38, 40 rotate, hook portion 68 of lock link 64 connects/engages with the hook portion 72 of the claw or latch claw 70 as shown in FIGS. 3A-3B. Further rotation of the second gear 40 forces crankshaft lever 62 to apply a torque to lock link 64 and force joint 66 to traverse in a semi-circular path 67 about pivot axis B. As joint 66 moves along semi-circular path 67 in an arcuate direction, it causes lock link 64 to ultimately move longitudinally in a direction of arrow 74 and rotate latch claw 70 as it applies a torque to latch claw 70 through the engagement of hook portion 68 with hook portion 72. As cable lever 34 moves from its rest position (See FIG. 2A) to a maximum travel or displacement position (shown in FIG. 4A) along the direction of arrow 76, it causes the first gear 38 to rotate and apply a rotational torque on the corresponding gear teeth of the second gear 40 causing the second gear 40 to also rotate. During this rotation, the lock link 64 applies a torque or force to the latch claw 70 to draw or rotate the latch claw 70 to a fully latched state and seal the door on the vehicle, which in turn compresses a sealing member about the vehicle door opening which may require higher closing forces as the seal is compressed.

Gear tooth 48 applies an ending torque on gear tooth 58 at the ending point of rotation of the first and second gears 38, 40 which is higher and would be the same as the gear ratio and torque of a pair of gears 38, 40 that have constant gear ratios however, the initial torque and load at the initial point (FIG. 2A) for the gears 38, 40 having varying gears ratios is lower than that of a pair of gears with a fixed gear ratios. Accordingly, it is appreciated that as pitch radius 50 decreases, pitch radius 52 increases as the gears 38 and 40 reach their end of travel (FIG. 4A) wherein the ending gear ratio and torque are substantially the same as that for a pair of gears 38 and 40 having a fixed gear ratio and fixed pitch radii or radiuses for the same ending torque or load however the initial torque or load of the gears 38, 40 with the varying gear ratios and varying pitch radiuses 50, 52 will be lower than the initial torque or load of the gears 38, 40 which have a non-varying gear ratio and non-varying pitch radius.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "front" and "opposite" are used herein, unless otherwise noted, merely for convenience of description, and are not limited to any one position or spatial orientation.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle latch, comprising:
   a first gear having a first plurality of gear teeth with a first involute form gear profile that follows a scroll profile with a first gear pitch radius that reduces from a first gear tooth to an ending gear tooth of the first plurality of gear teeth, the first gear being rotatably mounted to the latch for movement about a first gear axis;
   a second gear having a second plurality of gear teeth with a second involute form gear profile that follows a scroll profile with a second gear pitch radius that increases from a first gear tooth to an ending gear tooth of the second plurality of gear teeth, the second gear being rotatably mounted to the latch for movement about a second gear axis, wherein the second plurality of gear teeth meshingly engage the first plurality of gear teeth along a path defined between the first gear teeth of the first gear and the second gear and the ending gear teeth of the first gear and the second gear as first gear first gear rotates about the first axis and the second gear rotates about the second axis, wherein a torque applied to the first gear when the first gear tooth of the first gear engages the first gear tooth of the second gear in order to rotate the first gear about the first axis is lower than a torque applied to the first gear when the ending gear tooth of the first gear engages the ending gear tooth of the second gear in order to rotate the first gear about the first axis; and
   wherein rotation of the second gear causes a claw of the latch to move from a first position to a second position, the second position corresponding to a closed state of the latch.

2. The latch as in claim 1, wherein the latch further comprises a cable lever rotationally mounted to the latch for movement from a first position to a second position, the cable lever being operatively coupled to the first gear and a cable.

3. The latch as in claim 1, wherein the first gear is a spur gear and wherein the second gear is a spur gear.

4. The latch as in claim 2, wherein the cable lever further comprises a pawl rotationally mounted to the cable lever, the pawl having a feature configured to engage a feature of the first gear and wherein the first gear rotates in a first direction and wherein the second gear rotates in a second direction, when the cable lever is moved from the first position and the second position, the first direction being opposite to the second direction.

5. The latch as in claim 1, further comprising a lock link operably coupled to the second gear, the lock link being configured to engage the claw when the second gear is rotated about the second axis.

6. The latch as in claim 5, further comprising a crankshaft lever operably coupled to the second gear at one end and the lock link at another end.

7. The latch as in claim 6, wherein the crankshaft lever and the lock link are configured translate rotational movement of the second gear into longitudinal movement of the lock link.

8. A latch system, comprising:
   a motorized closure mechanism, including a motor configured to provide a force to a cable; and
   a latch operably coupled to the motorized closure mechanism, the latch comprising:
   a first gear having a first plurality of gear teeth with a first involute form gear profile that follows a scroll profile with a first gear pitch radius that reduces from a first gear tooth to an ending gear tooth of the first plurality of gear teeth, the first gear being rotatably mounted to the latch for movement about a first gear axis;
   a second gear having a second plurality of gear teeth with a second involute form gear profile that follows a scroll profile with a second gear pitch radius that increases from a first gear tooth to an ending gear tooth of the second plurality of gear teeth, the second gear being rotatably mounted to the latch for movement about a second gear axis, wherein the second plurality of gear teeth meshingly engage the first plurality of gear teeth along a path defined between the first gear teeth of the first gear and the second gear and the ending gear teeth of the first gear and the second gear as first gear first gear rotates about the first axis and the second gear rotates about the second axis, wherein a torque applied to the first gear when the first gear tooth of the first gear engages the first gear tooth of the second gear in order to rotate the first gear about the first axis is lower than a torque applied to the first gear when the ending gear tooth of the first gear engages the ending gear tooth of the second gear in order to rotate the first gear about the first axis; and wherein rotation of the second gear causes a claw of the latch to move from a first position to a second position, the second position corresponding to a closed state of the latch.

9. The system as in claim 8, wherein the latch further comprises a cable lever rotationally mounted to the latch for movement from a first position to a second position, the cable lever being operatively coupled to the first gear and a cable and wherein the first gear rotates in a first direction and wherein the second gear rotates in a second direction, when the cable lever is moved from the first positon and the second position, the first direction being opposite to the second direction.

10. The system as in claim 8, wherein the first gear is a spur gear and wherein the second gear is a spur gear.

11. The system as in claim 8, wherein the cable lever further comprises a pawl rotationally mounted to the cable lever, the pawl having a feature configured to engage a feature of the first gear.

12. The system as in claim 8, further comprising a lock link operably coupled to the second gear, the lock link being configured to engage the claw when the second gear is rotated about the second axis.

13. The system as in claim 12, further comprising a crankshaft lever operably coupled to the second gear at one end and the lock link at another end.

14. The system as in claim 13, wherein the crankshaft lever and the lock link are configured translate rotational movement of the second gear into longitudinal movement of the lock link.

15. A method of applying a closing force to a claw of a latch, the method including the steps of:
    rotating a cable lever rotationally mounted to the latch from a first position to a second position;
    rotating a first gear rotatably mounted to the latch with the cable lever as the cable lever moves from the first position to the second position;
    rotating a second gear rotatably mounted to the latch with the first gear, the second gear being in meshing engagement with the first gear and having a first plurality of gear teeth with a first involute form gear profile that follows a scroll profile with a first gear pitch radius that reduces from a first gear tooth to an ending gear tooth of the first plurality of gear teeth and wherein the second gear has a second plurality of gear teeth with a second involute form gear profile that follows a scroll profile with a second gear pitch radius that increases from a first gear tooth to an ending gear tooth of the second plurality of gear teeth, wherein the second plurality of gear teeth meshingly engage the first plurality of gear teeth along a path defined between the first gear teeth of the first gear and the second gear and the ending gear teeth of the first gear and the second gear as first gear first gear rotates about a first axis and the second gear rotates about a second axis, wherein a torque applied to the first gear when the first gear tooth of the first gear engages the first gear tooth of the second gear in order to rotate the first gear about the first axis is lower than a torque applied to the first gear when the ending gear tooth of the first gear engages the ending gear tooth of the second gear in order to rotate the first gear about the first axis; and wherein rotation of the second gear causes the claw of the latch to move from a first position to a second position, the second position corresponding to a closed state of the latch.

16. The method as in claim 15, wherein the latch further comprises a cable lever rotationally mounted to the latch for movement from a first position to a second position, the cable lever being operatively coupled to the first gear and a cable and wherein the first gear rotates in a first direction and wherein the second gear rotates in a second direction, when the cable lever is moved from the first position and the second position, the first direction being opposite to the second direction.

17. The method as in claim 15, wherein the first gear is a spur gear and wherein the second gear is a spur gear.

18. The method as in claim 16, wherein the latch further comprises a pawl rotationally mounted to the cable lever, the pawl having a feature configured to engage a feature of the first gear.

19. The method as in claim 15, wherein the latch further comprises a lock link operably coupled to the second gear, the lock link being configured to engage the claw when the second gear is rotated about the second axis.

20. The method as in claim 19, wherein the latch further comprises a crankshaft lever operably coupled to the second gear at one end and the lock link at another end.

* * * * *